United States Patent [19]
Mangigian

[11] Patent Number: 5,267,893
[45] Date of Patent: Dec. 7, 1993

[54] VEHICULAR ASHTRAY COIN HOLDER

[76] Inventor: Gretel C. Mangigian, 713 Coralview Ct., Midlothian, Va. 23113

[21] Appl. No.: 913,218

[22] Filed: Jul. 15, 1992

[51] Int. Cl.⁵ .............................. G07D 1/00
[52] U.S. Cl. .................. 453/54; 206/0.84; 296/37.9; 131/238
[58] Field of Search ............ 453/40, 41, 50, 51, 453/52, 53, 54, 63; 296/37.9, 37.11; 131/238; 206/0.81, 0.84; 385/901

[56] References Cited

U.S. PATENT DOCUMENTS

| | | | |
|---|---|---|---|
| 2,791,346 | 5/1957 | Tell | 296/37.9 X |
| 3,146,781 | 9/1964 | DeGeorge | 453/54 |
| 4,537,439 | 8/1985 | Otani | 206/0.81 X |
| 4,852,932 | 8/1989 | Komeya et al. | 296/37.9 |
| 5,000,535 | 3/1991 | Churchill | 385/901 X |

*Primary Examiner*—F. J. Bartuska
*Attorney, Agent, or Firm*—Leon Gilden

[57] ABSTRACT

A housing is secured within a vehicular ashtray, with the vehicular ashtray having a floor for receiving and mounting the housing thereon. The housing includes a plurality of top walls arranged in a tiered relationship relative to one another, with a finger recess directed into an upper wall for access to one of a plurality of wells receiving coins of various denominations into the respective wells.

2 Claims, 4 Drawing Sheets

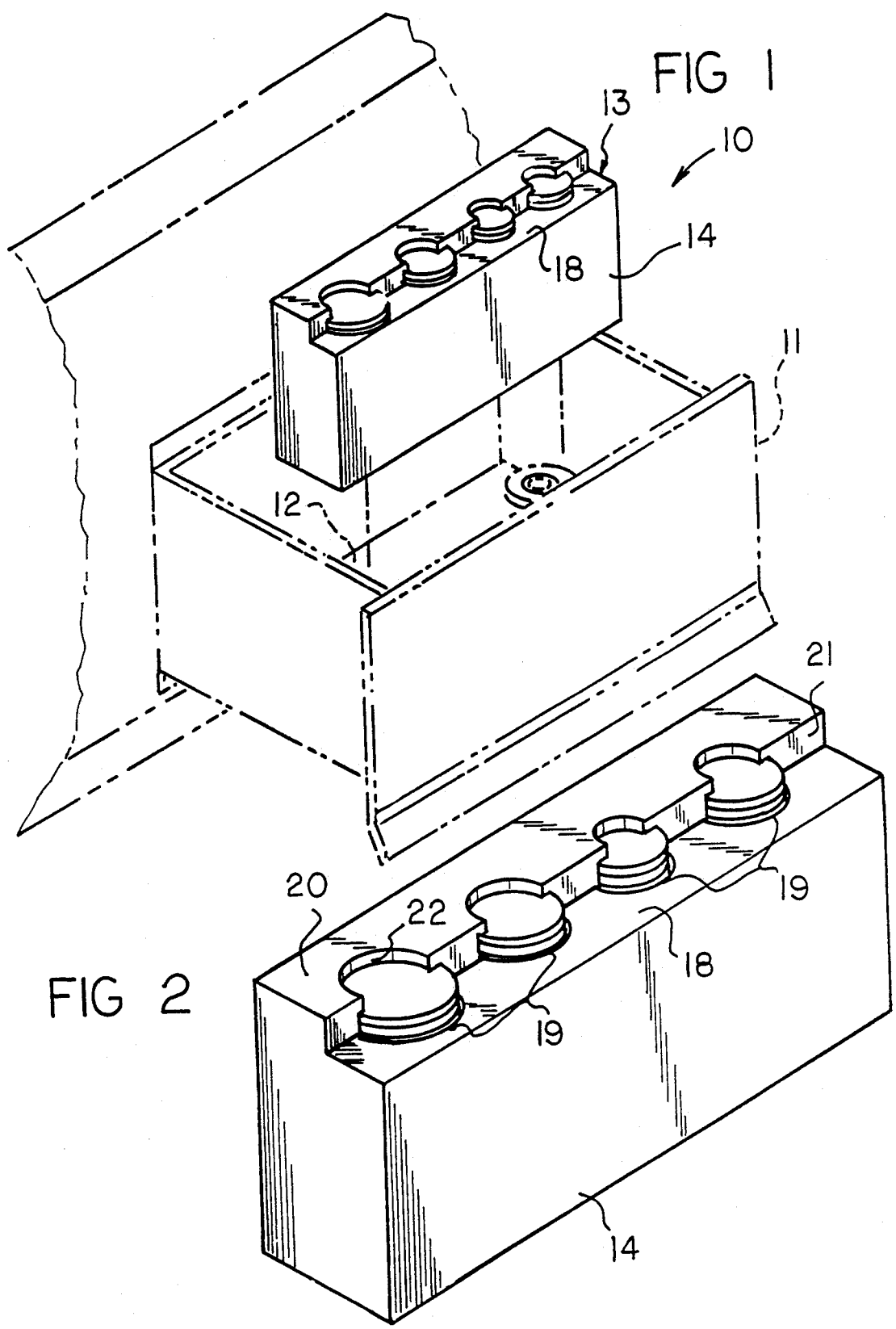

VEHICULAR ASHTRAY COIN HOLDER

BACKGROUND OF THE INVENTION

1. Field of the Invention

The field of invention relates to coin holder structure, and more particularly pertains to a new and improved vehicular ashtray coin holder wherein the same is arranged in secured relationship within a vehicular ashtray for selective dispensing of coins therefrom.

2. Description of the Prior Art

While vehicles are equipped with ashtrays, the degree of contemporary population not engaging in their use is increasing. To provide for utilization of such structure, the instant invention sets forth a coin holder dispenser organization arranged for mounting within a vehicular ashtray in a selectively secured relationship. The prior art has heretofore failed to address the specialized and unique advantageous utilization of vehicular ashtrays, wherein coin holder structure such as exemplified in U.S. Pat. Nos. 4,765,154; 4,905,823; 3,592,204; 4,595,100; and 4,836,365 have heretofore set forth various coin holder structure but have not availed the construction to utilize a vehicular ashtray as set forth by the instant invention and in this respect, the present invention substantially fulfills this need.

SUMMARY OF THE INVENTION

In view of the foregoing disadvantages inherent in the known types of coin holder apparatus now present in the prior art, the present invention provides a vehicular ashtray coin holder wherein the same is arranged for mounting within a vehicular ashtray. As such, the general purpose of the present invention, which will be described subsequently in greater detail, is to provide a new and improved vehicular ashtray coin holder which has all the advantages of the prior art coin holder apparatus and none of the disadvantages.

To attain this, the present invention provides a housing secured within a vehicular ashtray, with the vehicular ashtray having a floor for receiving and mounting the housing thereon. The housing includes a plurality of top walls arranged in a tiered relationship relative to one another, with a finger recess directed into an upper wall for access to one of a plurality of wells receiving coins of various denominations into the respective wells.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular ashtray coin holder which has all the advantages of the prior art coin holder apparatus and none of the disadvantages.

It is another object of the present invention to provide a new and improved vehicular ashtray coin holder which may be easily and efficiently manufactured and marketed.

It is a further object of the present invention to provide a new and improved vehicular ashtray coin holder which is of a durable and reliable construction.

An even further object of the present invention is to provide a new and improved vehicular ashtray coin holder which is susceptible of a low cost of manufacture with regard to both materials and labor, and which accordingly is then susceptible of low prices of sale to the consuming public, thereby making such vehicular ashtray coin holders economically available to the buying public.

Still yet another object of the present invention is to provide a new and improved vehicular ashtray coin holder which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of this invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an enlarged isometric illustration of the invention.

DESCRIPTION OF THE PREFERRED EMBODIMENT

Figure 3:
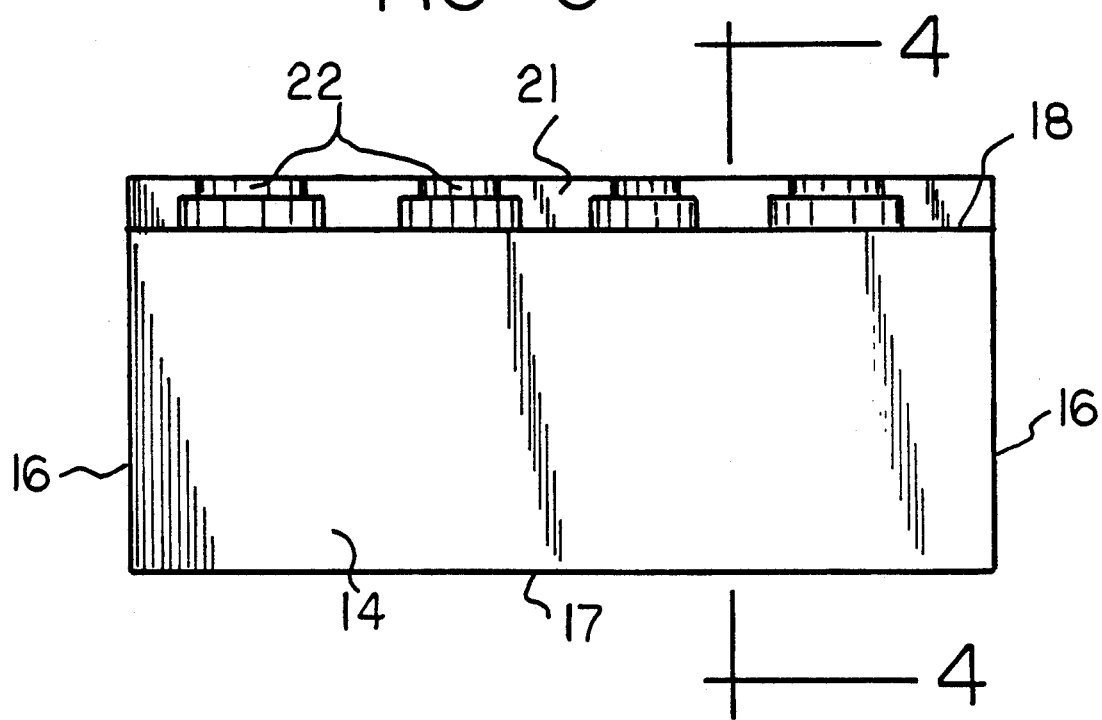
FIG. 3 is an orthographic frontal view of the invention.

With reference now to the drawings, and in particular to FIGS. 1 to 7 thereof, a new and improved vehicular ashtray coin holder embodying the principles and concepts of the present invention and generally designated by the reference numeral 10 will be described.

More specifically, the vehicular ashtray coin holder 10 of the instant invention essentially comprises a vehicular ashtray 11 having an ashtray floor 12 mounted within a cavity defined within a surrounding wall of the vehicular ashtray. A coin holder housing 13 is provided, including a housing front wall 14 spaced from a housing rear wall 15, with spaces housing side walls and a housing floor 17. A housing first top wall 18 is oriented parallel relative to the floor and spaced thereover, and a housing second top wall 20 is oriented parallel to and above the first top wall 18. The first top wall extends from the front wall towards the rear wall, with the second top wall 20 extending from the rear wall towards the front wall, and a plurality of parallel cylindrical wells 19 orthogonally oriented relative to the first and second top walls extending towards the floor 17, with each of the wells diametrically intersected by the respective first and second top walls 18 and 20. A face wall 21 extends downwardly from the second top wall 20 towards the first top wall 18, with each of the wells including a semi-cylindrical finger recess 22 extending into the top wall coaxially aligned relative to each well to provide for grasping of a coin positioned within each well, with a semi-annular flange formed below and between each of the finger recesses 22 and the underlying respective wells 19. In this manner as half of each of the wells 19 extends below the first top wall 18 and one-half of each well extending below the second top wall 20, the coins extend and project above each of the first top walls for ease of access, as illustrated in FIG. 2.

Figure 4:
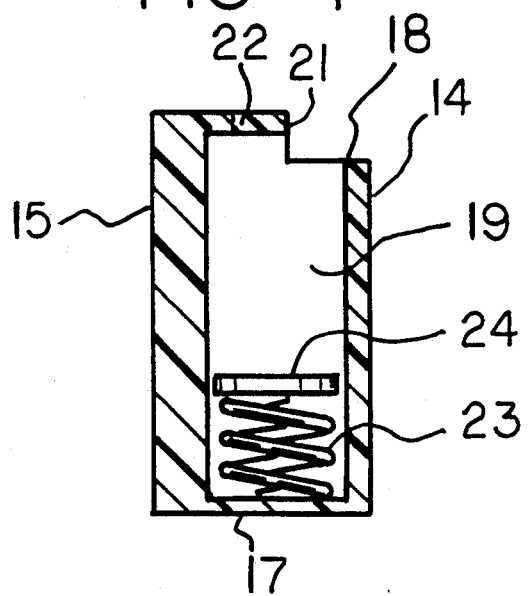
FIG. 4 is an orthographic view, taken along the lines 4—4 of FIG. 3 in the direction indicated by the arrows.

With reference to FIG. 4, each of the wells 19 includes a cavity plate 24 mounted within each cavity below each of the wells 19, with a spring 23 captured between each cavity plate 24 and the underlying floor 17.

Figure 5:
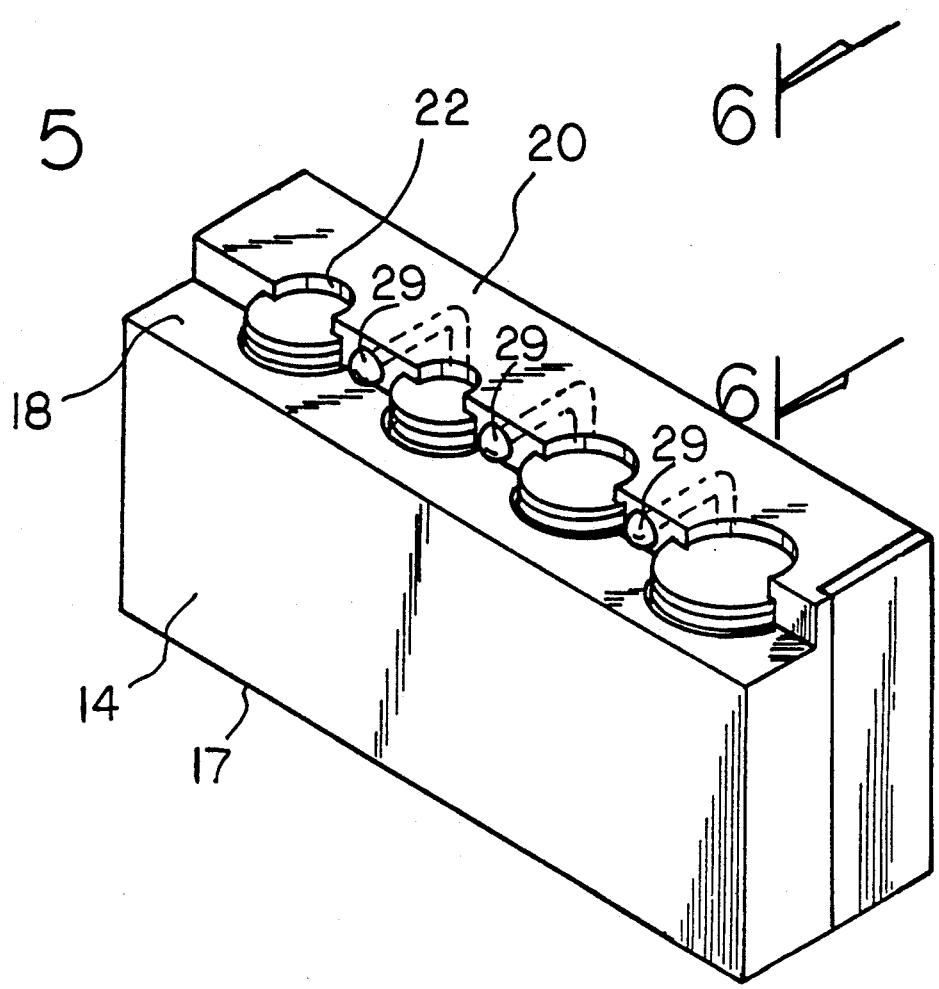
FIG. 5 is an isometric illustration of the invention utilizing light members.
Figure 6:
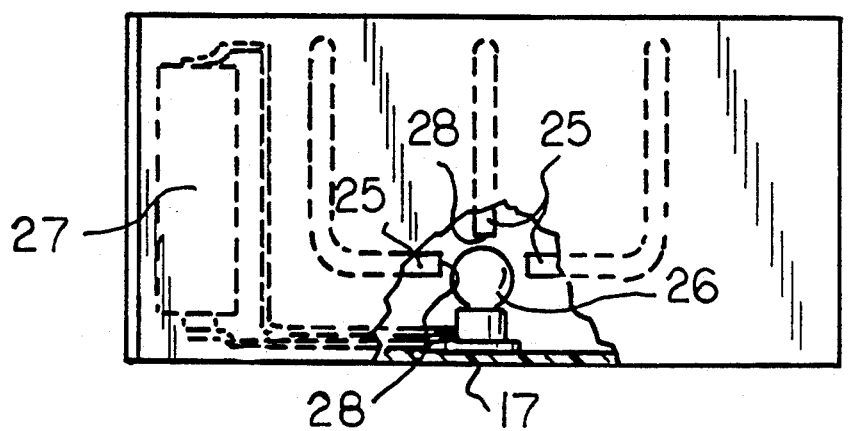
FIG. 6 is an orthographic view, taken along the lines 6—6 of FIG. 5 in the direction indicated by the arrows.

The structure as exemplified in the FIGS. 5 and 6 further includes the use of visual indicator members configured as a plurality of fiber optic cables 25, each having a fiber optic cable first end 28 directed into the housing, with an illumination bulb 26 operative through a battery 27, and each of the cable first ends 28 positioned in adjacency relative to the illumination bulb for projecting illumination through each fiber optic cable 25. Each fiber optic cable includes a second end 29 positioned medially of a plurality of the wells 19 to indicate orientation of each of the wells and their respective coin denominations. If desired, an on/off electrical switch may be mounted within the housing between the battery 27 and the illumination bulb 26.

Figure 7:
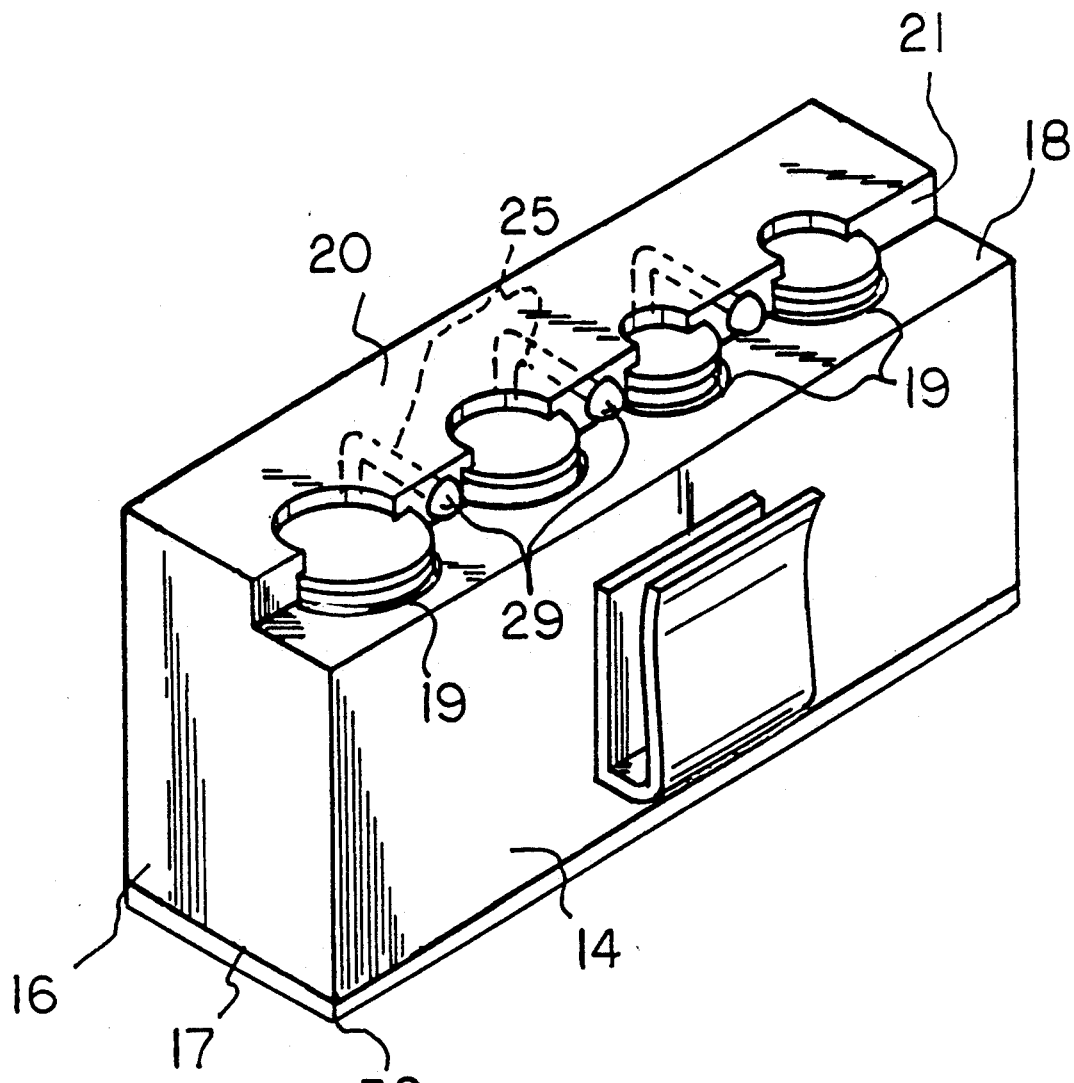
FIG. 7 is an isometric illustration of the invention illustrating the employment of a magnetic base plate and spring clip structure.

The FIG. 7 indicates the floor 17 having a magnetic plate 30 coextensive therewith for magnetic adherence to the ashtray floor 12. Further, a spring clip 31 may be mounted to the front wall 14 for securement of paper currency for ease of access to an individual within an associated vehicle mounting the ashtray 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular ashtray coin holder, comprising,
   a vehicular ashtray having an ashtray continuous side wall, and an ashtray floor, and
   a coin holder housing, the coin holder housing including a housing front wall spaced from a housing rear wall, and spaced housing side walls, and a housing floor, and
   the coin holder housing including a housing first top wall extending from the housing front wall medially of the housing side walls, and
   a housing second top wall extending from the housing rear wall medially of the side walls, with the housing second top wall positioned above the housing first top wall, and a face wall extending from the housing second top wall to the housing first top wall, and
   a plurality of cylindrical wells directed into the coin holder housing extending from the housing first top wall and the housing second top wall orthogonally oriented relative to the housing floor, wherein the housing first top wall and the housing second top wall each medially intersect each of the wells, and
   the second top wall includes a plurality of semi-cylindrical finger recesses, and each finger recess is defined by a predetermined diameter, and each well associated with each recess is defined by a well diameter less than the predetermined diameter, and an annular abutment flange in confrontation to each well directed into the second top wall adjacent each finger recess, and a cavity plate mounted movably within each cylindrical well, and a spring member mounted within each well captured between each cavity plate within each well and the housing floor, and
   a battery contained within the housing, and an illumination bulb in electrical communication with the battery for effecting illumination of the illumination bulb, and a plurality of fiber optic cables, each fiber optic cable including a first end positioned in adjacency relative to the illumination bulb, and each fiber optic cable including a second end, with each second end positioned between a plurality of said wells.

2. A coin holder as set forth in claim 1 wherein the housing front wall includes a spring clip mounted thereon for securement of currency relative to the housing, and the housing floor includes a magnetic plate coextensive with the housing floor for magnetic adherence to the ashtray floor.

* * * * *